(12) United States Patent  (10) Patent No.: US 12,462,894 B2
Huang et al.  (45) Date of Patent: Nov. 4, 2025

(54) MEMORY DEVICE TEST SYSTEM (71) Applicant: NANYA TECHNOLOGY CORPORATION, New Taipei (TW)

(72) Inventors: Yi-Kai Huang, Taoyuan (TW); Hung-Kai Chan, Taoyuan (TW); Ting Hsuan Lin, Taoyuan (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 226 days.

(21) Appl. No.: 18/520,910

(22) Filed: Nov. 28, 2023

(65) Prior Publication Data

US 2025/0174295 A1 May 29, 2025

(51) Int. Cl.
*G11C 29/56* (2006.01)

(52) U.S. Cl.
CPC .. *G11C 29/56004* (2013.01); *G11C 29/56016* (2013.01); *G11C 2029/5602* (2013.01)

(58) Field of Classification Search
CPC ........ G11C 29/56004; G11C 29/56016; G11C 2029/5602; G11C 29/48; G11C 29/56; G06F 11/2205; G06F 11/2273; G06F 11/2284
See application file for complete search history.

(56) References Cited

U.S. PATENT DOCUMENTS 6,421,798 B1 * 7/2002 Lin ................. G11C 29/56
714/718
2018/0096979 A1 4/2018 Pappu et al.

* cited by examiner

*Primary Examiner* — Xiaochun L Chen
(74) *Attorney, Agent, or Firm* — CKC & Partners Co., LLC (57) ABSTRACT

A memory device test system includes a memory device, a tester, a system board, and an interface card. The tester generates a first control signal corresponding to a test being performed to the memory device. The system board is coupled to the tester and generates, in response to the first control signal, a second control signal to the memory device. The interface card is coupled to the tester, the system board, and the memory device and transmits to the memory device, in response to a switch signal received from the tester, a power signal from the tester through a first conductive path or from the system board through a second conductive path. The memory device generates, in response to the power signal and the second control signal, an output signal corresponding to the test to the tester.

15 Claims, 5 Drawing Sheets

MEMORY DEVICE TEST SYSTEM

BACKGROUND

Field of Disclosure

The present disclosure relates to a memory device test system and a memory device test method. More particularly, the present disclosure relates to a memory device test system providing an interface for additional test signal(s) from an external device.

Description of Related Art

The performance and functionality of memory devices under various conditions are required and memory devices are needed to undergo different types of tests. In order to input a certain type of test signals, modifications should be made to the circuit between the memory device and the system board carrying the memory device. The modifications include the replacement of components, such as inductor, capacitor or adjustable resistor in the compensation circuit. However, the pattern of the commercial system board is fixed and any modification would inevitably cause damage to the system board.

SUMMARY

A memory device test system according to some embodiments of the present disclosure is provided and has the following elements: a memory device, a tester, a system board and an interface card. The tester generates a first control signal corresponding to a test being performed to the memory device. The system board is coupled to the tester and generates, in response to the first control signal, the second control signal to the memory device. The interface card is coupled to the tester, the system board, and the memory device and transmits to the memory device, in response to a switch signal received from the tester, a power signal from the tester through a first conductive path or from the system board through the second conductive path. The memory device generates, in response to the power signal and the second control signal, an output signal corresponding to the test to the tester.

In some embodiments, the tester includes a power supply device, which generates the power signal.

In some embodiments, the interface card includes the first conductive segment coupled to the system board; the second conductive segment coupled to the memory device; and a connection device interposed between the first conductive segment and the second conductive segment, and configured to electrically connect, in response to the switch signal, the first conductive segment to the second conductive segment.

In some embodiments, the interface card further includes the first conductive line and the second conductive line. The first conductive line is coupled between the first conductive segment and the system board and extends in the X direction in the first layer of the interface card. The second conductive line is coupled between the memory device and the second conductive segment and extends in the X direction in the second layer of the interface card. The first layer of the interface card is below the second layer of the interface card.

In some embodiments, the connection device includes a switch and the switch is configured to be turned on in response to the switch signal to conduct the second conductive path.

In some embodiments, the connection device is turned on to form the second conductive path and the first conductive segment, the second conductive segment, and the connection device are included in the second conductive path. The connection device is turned off to form the first conductive path and the second conductive segment is included in the first conductive path.

In some embodiments, an extension card is interposed between the system board and the interface card.

In some embodiments, the extension card includes a conductive segment on a surface of the extension card and a conductive line coupled between the conductive segment and the system board.

In some embodiments, the memory device transmits the output signal corresponding to the test through the system board.

A memory device test system includes a memory device, a tester, and an intermediate device. The tester generates a first control signal and a first power signal corresponding to a test being performed to the memory device, and a switch signal. The intermediate device is coupled between the memory device and the tester and generates, in response to the first control signal, the second control signal, and the second power signal, and further transmits, in response to the switch signal, either first power signal or the second power signal to the memory device. The memory device generates, in response to the first power signal, the second control signal, and the second power signal, an output signal corresponding to the test to the tester.

In some embodiments, the intermediate device includes the first conductive segment, the second conductive segment, a connection device coupled between the first conductive segment and the second conductive segment, and a system board coupled to the first conductive segment.

In some embodiments, the first conductive segment, the second conductive segment, and the connection device are included in the first conductive path coupled to the memory device, and the second conductive segment is included in the second conductive path coupled to the memory device.

In some embodiments, the connection device is turned on, in response to the switch signal, to form the first conductive path to transmit the second power signal.

In some embodiments, the connection device is turned off, in response to the switch signal, to form the second conductive path to transmit the first power signal.

In some embodiments, the first control signal, the second control signal, and the output signal are transmitted through the system board.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," "containing," "involving," and the like are to be understood to be open-ended, i.e., to mean including but not limited to.

Reference throughout the specification to "one embodiment," "an embodiment," or "some embodiments" means that a particular feature, structure, implementation, or characteristic described in connection with the embodiment(s) is included in at least one embodiment of the present disclosure. Thus, uses of the phrases "in one embodiment" or "in an embodiment" or "in some embodiments" in various places throughout the specification are not necessarily all referring to the same embodiment. Furthermore, the particular features, structures, implementation, or characteristics may be combined in any suitable manner in one or more embodiments.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. As used herein, the term "and/or" includes any and all combinations of one or more of the associated listed items.

As used herein, "around", "about", "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

Figure 1:
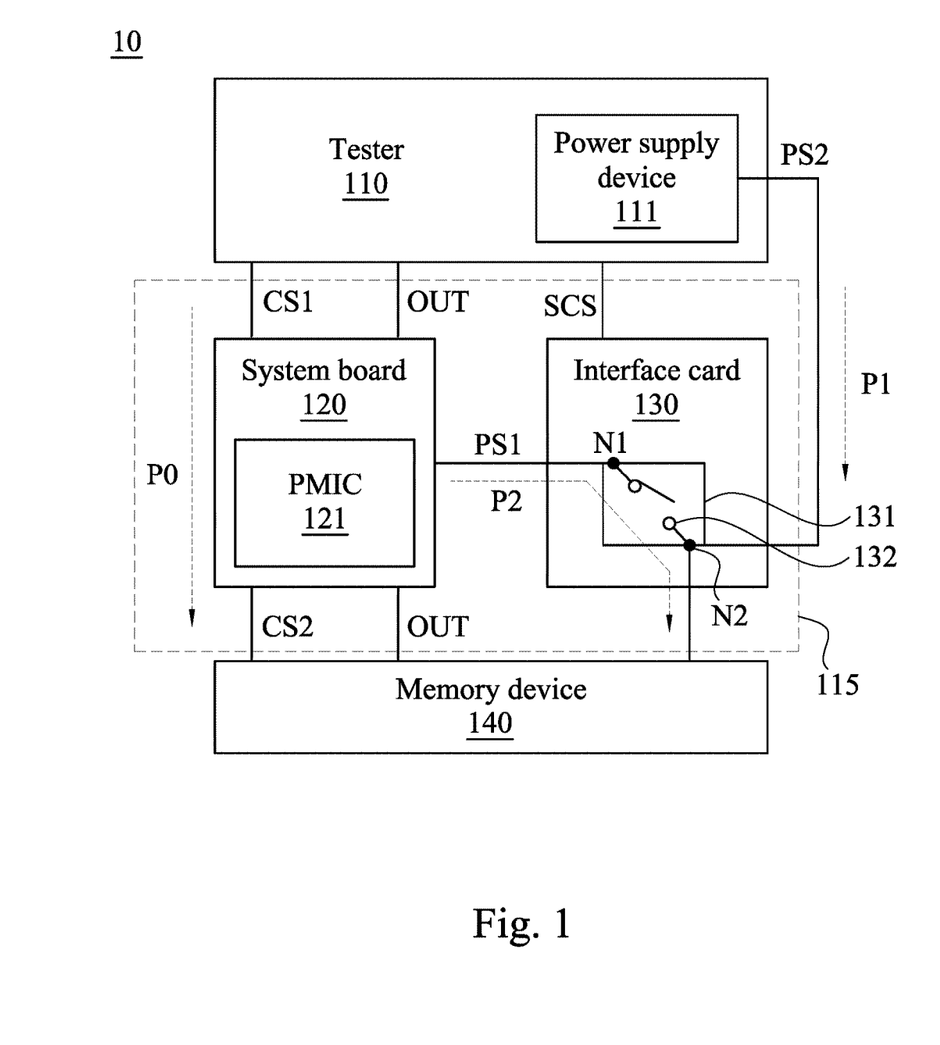
FIG. 1 is a block diagram of a memory test system, in accordance with some embodiments.

Reference is made to FIG. 1. FIG. 1 is a block diagram of a memory test system 10, according to some embodiments. In FIG. 1, the memory test system 10 includes a tester 110, an intermediate device 115 and a memory device 140. The tester 110 is electrically coupled to the intermediate device 115 and the intermediate device 115 is electrically coupled to the memory device 140. The intermediate device 115 includes a system board 120 and an interface card 130. The system board 120 and the interface card 130 are electrically coupled.

In some embodiments, the implementation of the system board 120 may be a mother board including an integrated circuit for power management.

In some embodiments, the implementation of the memory device 140 may include any type of fixed or moveable random access memory (RAM), read-only memory (ROM), flash memory, hard disk drive (HDD), solid state drive (SSD) or a combination of the similar components or the above-mentioned components.

In some embodiments, the tester 110 generates a control signal CS1 corresponding to a test(s) being performed to the memory device and further transmits the control signal CS1 to the system board 120 through a conductive path P0. The system board 120 further generates, in response to the control signal CS1, a control signal CS2 to the memory device 140 through the conductive path P0 in order to perform the test(s) on the memory device 140. For example, the test may include, for example, a read/write operation or other operations that are conducted to test the functionality and performance of the memory device 140. After the test, the memory device 140 transmits, in response to the control signal CS2, an output signal(s) OUT corresponding to the test to the tester 110 through the system board 120. The tester 110 further generates a test result of the memory device 140 based on the output signal OUT from the memory device 140.

For example, when the output signal OUT from the memory device 140 mismatches the desired result corresponding to the performed test, the tester 110 generates the test result indicating the memory device 140 fails to conduct some operations. In such condition, according to some embodiments, the memory device 140 will be taken out for repair. On contrary, when the output signal OUT matches the desired result, the test result indicates that the memory device 140 is qualified.

In some embodiments, during the test, supply voltages for operating the memory device 140 is provided through the interface card 130 coupled to either the system board 120 or a power supply device 111 in the tester 110. For illustration, the tester 110 includes the power supply device 111. The system board 120 includes a PMIC 121 (Power Management IC, PMIC). The interface card 130 comprises a node N1, a node N2 and a connection device 131 coupled between the node N1 and the node N2. In some embodiments, the connection device 131 includes a switch 132 having a terminal coupled to the node N1 and another terminal coupled to the node N1.

In the embodiments of the memory device 140 obtaining the supply voltage through the system board 120, the system board 120 controls the PMIC 121 according to the control signal CS1 to generate a power signal PS1 to the memory device 140. The power signal PS1 is transmitted through a conductive path P2 formed by the node N1, the connection device 131 and the node N2. The tester 110 generates a switch signal SCS to the interface card 130 to turn on the switch 132 in the connection device 131. Accordingly, the node N1 is electrically coupled to the node N2 and the power signal PS1 is transmitted to the memory device 140 through the interface card 130 for operating the memory device 140 during the test. In some embodiments, the power signal PS1 has a supply voltage VDD (e.g., VDD may be 1.9 V). After the test, the memory device 140 transmits, in response to the power signal PS1, the output signal OUT corresponding to the test to the tester 110 through the system board 120. Then, the tester 110 generates a test result of the memory device 140 based on the output signal OUT from the memory device 140.

The test result of the memory device 140 corresponds to the functionality and performance of the memory device 140 under the operation instructed by the power signal PS1 from the PMIC 121. For instance, when the output signal OUT from the memory device 140 mismatches the desired result corresponding to the performed test, the tester 110 generates the test result indicating the memory device 140 fails to operate under the conditions (e.g., the supply voltage VDD). Then, the memory device 140 is taken out for modifications. When the output signal OUT matches the desired result, the test result indicates the memory device 140 is qualified.

In the embodiments of the memory device 140 obtaining the supply voltage through the power supply device 111, the tester 110 generates the switch signal SCS to turn off the switch 132 in the interface card 130. After the switch 132 is turned off, the power supply device 111 in the tester 110 generates and transmits a power signal PS2 to the memory device 140 through the interface card 130. Specifically, the power signal PS2 is transmitted through the node N2 on the interface card 130 through a conductive path P1 in FIG. 1.

The power supply device 111 in the tester 110 generates the power signal PS2 to simulate electric noises that may appear in the electronics (e.g., voltage spike or voltage ripple) or to provide a certain voltage value that cannot be generated by the PMIC 121. The stability of the memory device 140 is directly tested under the power signal PS2. After the test, the memory device 140 transmits, in response to the power signal PS2, the output signal OUT corresponding to the test to the tester 110 through the system board 120. Then, tester 110 generates a test result of the memory device 140 based on the output signal OUT from the memory device 140.

The test result of the memory device 140 corresponds to the stability of the memory device 140 under the operation instructed by the power signal PS2 directly from the power supply device 111. For example, when the output signal OUT from the memory device 140 mismatches the desired result corresponding to the performed test, the tester 110 generates the test result indicating the memory device 140 fails to operate under the conditions (e.g., voltage spike or voltage ripple). Then, the memory device 140 is taken out for improvement. When the output signal OUT matches the desired result, the tester 110 generates the test result indicating the memory device 140 is qualified.

In some approaches, the test method of memory devices involves modifications to the circuit on a mother board. For example, an operator has to modify the circuit in order to apply additional test signals (e.g., signals generated to simulate spike or ripple voltage) by cutting the original electrical path of the circuit (e.g., replacement of elements in the circuit). In such arrangements, extra works for modifications are needed and the risk of damage to the circuit may be highly increased. With the configurations of the present application, the above-mentioned issue may be dealt with by utilizing the paths provided by the interface card. As a result, the operator may input various test signals into the memory device through the path in the interface card without concerns about the damage to the circuit.

Figure 2:
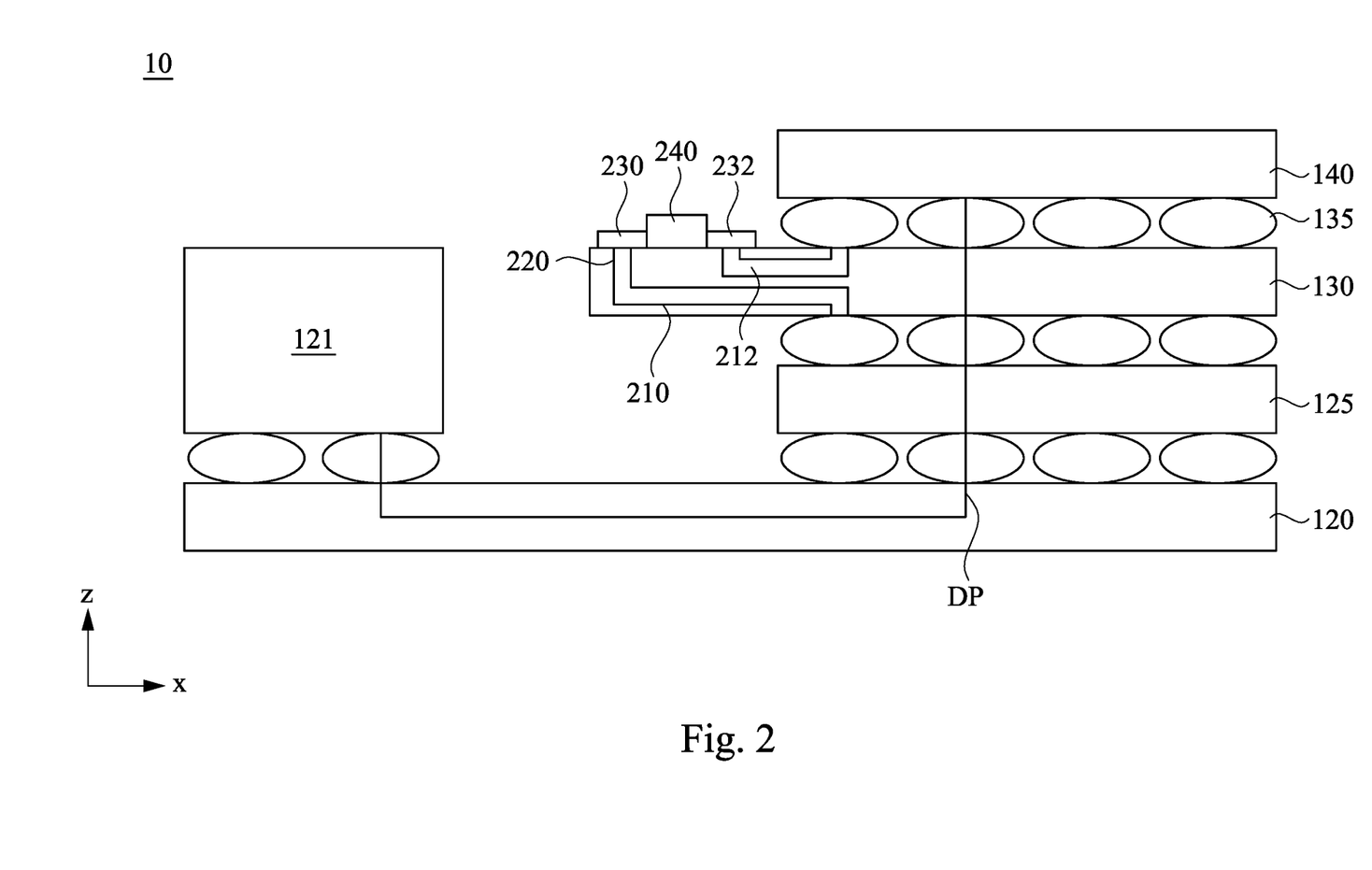
FIG. 2 is a schematic diagram of part of the memory test system in FIG. 1, in accordance with some embodiments.

Reference is made to FIG. 2. FIG. 2 is a schematic diagram of part of the memory test system 10 in FIG. 1, in accordance with some embodiments.

In FIG. 2, the system board 120, the PMIC 121, the interface card 130, and the memory device 140 are coupled with each other by (metal) bumps 135. In some embodiments in FIG. 2, an extension card 125 is interposed between the interface card 130 and the system board 120 and is included in the intermediate device 115 of FIG. 1 for providing flexibility of adjustments in the structural configurations of the intermediate device 115. The PMIC 121 is disposed on the system board 120. The extension card 125, the interface card 130 and the memory device 140 are arranged in the Z direction. The extension card 125 is disposed on the system board 120, the interface card 130 is disposed on the extension card 125, and the memory device 140 is disposed on the interface card 130. The PMIC 121 and the stack of the extension card 125, interface card 130, and memory device 140 are separated by a distance in the X direction.

Reference is made to FIG. 2. In some embodiments in FIG. 2, the interface card 130 includes a conductive line 210, a conductive line 212 and a conductive via 220. The conductive line 210 and the conductive line 212 are in different layers and the two layers extend in the X direction. The conductive line 212 is above the conductive line 210. The interface card 130 includes a conductive segment 230 and a conductive segment 232 that are arranged on the surface of the interface card 130. The conductive segment 230 is electrically coupled to the conductive line 210 through the conductive via 220, and the conductive segment 232 is electrically coupled to the conductive line 212. A connection device 240 is located on the surface of the interface card 130 and between the conductive segments 230 and 232.

The conductive segments 230 and 232 and the connection device 240 are arranged in the X direction, and between the PMIC 121 and the stack of the extension card 125, interface card 130, and memory device 140.

In some embodiments, the conductive segment 230 and the conductive segment 232 respectively correspond to the node N1 and the node N2 in FIG. 1. The connection device 240 corresponds to the connection device 131 in FIG. 1. In some embodiments, instead of the connection device 240 including the switch 132, the connection device 240 is implemented by an indium wire. In other embodiments, the interface card 130 further includes a compensation circuit(s) (not depicted in FIG. 2) (e.g., pulse width modulation circuit (PWM circuit)) that is on the surface of the interface card 130 and configured to filter/level shift the received power signal.

In some embodiments, the system board 120 transmits the control signal CS2 to the memory device 140 and receives the output signal OUT from the memory device 140 through the extension card 125, the bump 135, and the interface card 130.

The conductive path P0 in FIG. 1 that transmits the control signals CS1 and CS2 through the system board 120 corresponds to a direct path DP in FIG. 2 (the tester 110 is not depicted in FIG. 2).

In operations of transmitting the power signal PS1 from the PMIC 121 to the memory device 140, the connection device 240 is turned on to electrically connect the conductive segment 230 with the conductive segment 232 in response to the switch signal SCS from the tester 110. The connecting relation between the tester 110 and the connection device 240 is omitted here. Accordingly, the PMIC 121 transmits the power signal PS1 to the memory device 140 through the conductive path P2 including the bumps 135, the system board 120, the extension card 125, the conductive line 210, the conductive via 220, the conductive segment 230, the connection device 240, the conductive segment 232 and the conductive line 212.

In operations of transmitting the power signal PS2 from the power supply device 111 to the memory device 140, the tester 110 transmits the switch signal SCS to the connection device 240 to turn off the connection device 240. After the connection device 240 is turned off to electrically isolate the conductive segment 232 from the conductive segment 230, the power supply device 111 transmits the power signal PS2 to the memory device 140 through the conductive path P1 including the conductive segment 232, the conductive line 212, and the bump 135.

Figure 3:
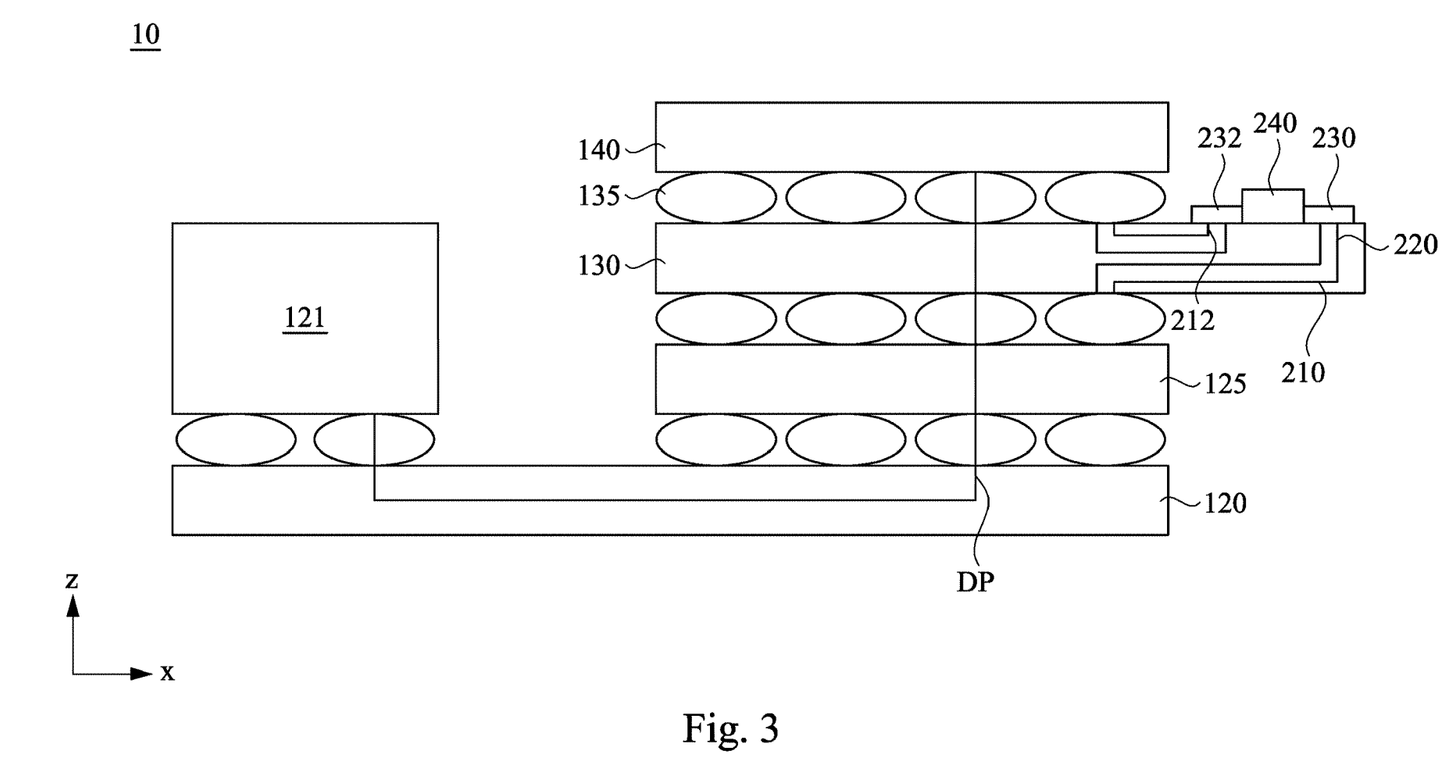
FIG. 3 is a schematic diagram of part of the memory test system in FIG. 1, in accordance with other embodiments.

Reference is made to FIG. 3. FIG. 3 is a schematic diagram of part of the memory test system 10 in FIG. 1, in accordance with other embodiments. With respect to the embodiments of FIG. 2, like elements in FIG. 3 are designated with the same reference numbers for ease of understanding. The specific operations of similar elements, which are already discussed in detail in above paragraphs, are omitted herein for the sake of brevity.

Comparing with the embodiments of FIG. 2, instead of arranging the conductive segments 230 and 232 and the connection device 240 interposed between the PMIC 121 and the memory device 140, the conductive segments 230 and 232 and the connection device 240 are arranged on an opposite side of the interface card 130, providing ease in connection between the tester 110 and the interface card 130.

Figure 4:
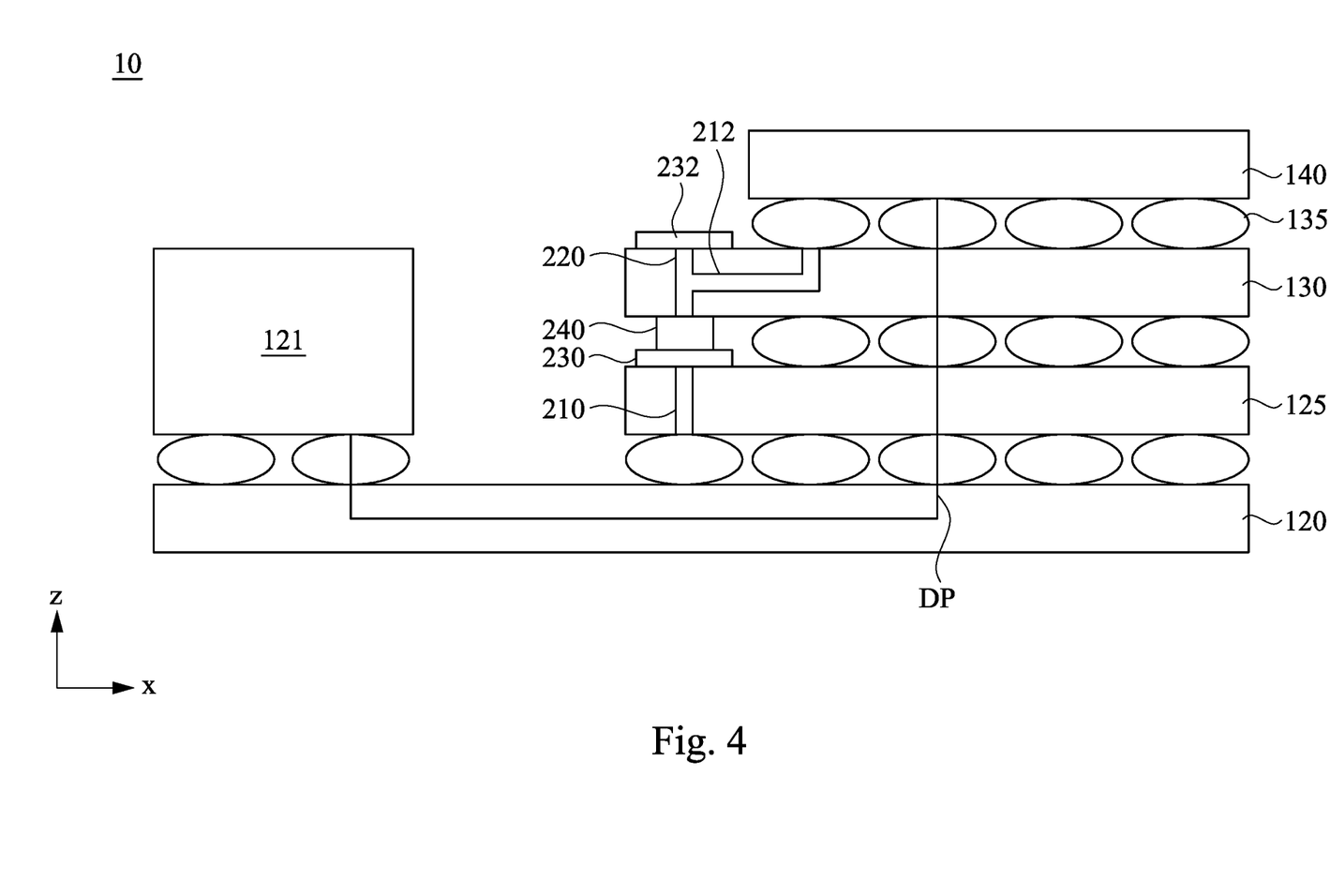
FIG. 4 is a schematic diagram of part of the memory test system in FIG. 1, in accordance with other embodiments.

Reference is made to FIG. 4. FIG. 4 is a schematic diagram of part of the memory test system 10 in FIG. 1, in accordance with some embodiments. With respect to the embodiments of FIG. 2, like elements in FIG. 3 are designated with the same reference numbers for ease of understanding.

The electrical relation between FIG. 4 and FIG. 1 is similar to the electrical relation between FIG. 2 and FIG. 1 and the statements are omitted here.

Comparing with the embodiments of FIG. 2, instead of arranging the conductive segments 230 and 232 and the connection device 240 in the X direction, the conductive segments 230 and 232 and the connection device 240 are arranged in a different direction. As illustratively shown in FIG. 4, the conductive segments 230 and 232, and the connection device 240 are arranged in the Z direction and between the PMIC 121 and the memory device 140. Specifically, the conductive segment 230 is on the extension card 125, and the conductive segment 232 is on the interface card 130 and the connection device 240 is between the extension card 125 and the interface card 130.

Comparing with the embodiments of FIG. 2, instead of arranging both the conductive lines 210 and 212 in the interface card 130, the conductive lines 210 and 212 are in different cards. Specifically, the conductive line 210 is in the extension card 125 and the conductive line 212 is in the interface card 130. The conductive lines 210 and 212 and connection device 240 are arranged in the Z direction and between the PMIC 121 and the memory device 140.

Figure 5:
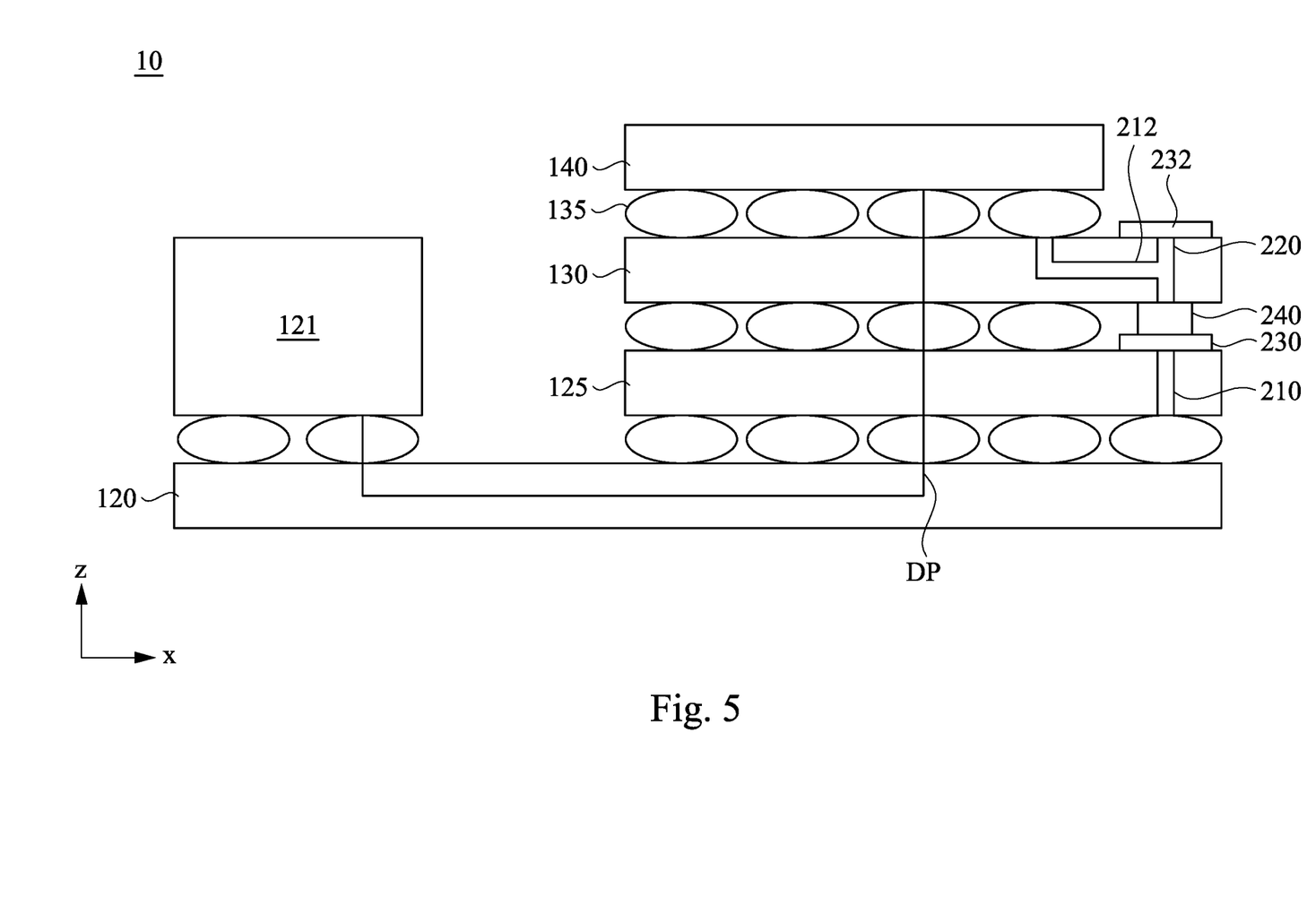
FIG. 5 is a schematic diagram of part of the memory test system in FIG. 1, in accordance with some other embodiments.

Reference is made to FIG. 5. FIG. 5 is a schematic diagram of part of the memory test system 10 in FIG. 1, in accordance with some embodiments. With respect to the embodiments of FIG. 2, like elements in FIG. 3 are designated with the same reference numbers for ease of understanding.

The electrical relation between FIG. 5 and FIG. 1 is similar to the electrical relation between FIG. 2 and FIG. 1 and, therefore, the statements are not repeated here.

Comparing with the embodiments of FIG. 4, instead of arranging the conductive segments 230 and 232 and the connection device 240 interposed between the PMIC 121 and the memory device 140, the conductive segments 230 and 232 and the connection device 240 are arranged on an opposite side. Specifically, the conductive segment 230 is on an opposite side of the extension card 125 and the conductive segment 232 is on an opposite side of the interface card 130.

As above, the memory device test system in the present disclosure provides an intermediate device between the system board and the memory device under test. By the configuration above, additional test signals or test signals that cannot be generated by the PMIC can be input through the intermediate device from an external tester. The configuration simplifies the test procedure that modifications to the system board are involved.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device test system, comprising:
    a memory device;
    a tester configured to generate a first control signal corresponding to a test being performed to the memory device;
    a system board coupled to the tester and configured to generate, in response to the first control signal, a second control signal to the memory device; and
    an interface card coupled to the tester, the system board and the memory device, and configured to transmit to the memory device, in response to a switch signal received from the tester, a power signal from the tester through a first conductive path or from the system board through a second conductive path,
    wherein the memory device is configured to generate, in response to the power signal and the second control signal, an output signal corresponding to the test to the tester.

2. The memory device test system of claim 1, wherein the tester comprises:
    a power supply device configured to generate the power signal.

3. The memory device test system of claim 1, wherein the interface card comprises:
    a first conductive segment coupled to the system board;
    a second conductive segment coupled to the memory device; and a connection device interposed between the first conductive segment and the second conductive segment, and configured to electrically connect, in response to the switch signal, the first conductive segment to the second conductive segment.

4. The memory device test system of claim 3, wherein the interface card further comprises:
a first conductive line coupled between the first conductive segment and the system board and extending in an X direction in a first layer of the interface card; and
a second conductive line coupled between the memory device and the second conductive segment and extending in the X direction in a second layer of the interface card,
wherein the first layer of the interface card is below the second layer of the interface card.

5. The memory device test system of claim 3, wherein the connection device comprises a switch,
wherein the switch is configured to be turned on in response to the switch signal to conduct the second conductive path.

6. The memory device test system of claim 3, wherein the connection device is turned on to form the second conductive path, and
the first conductive segment, the second conductive segment, and the connection device are included in the second conductive path,
wherein the connection device is turned off to form the first conductive path, and the second conductive segment is included in the first conductive path.

7. The memory device test system of claim 1, further comprising:
an extension card interposed between the system board and the interface card.

8. The memory device test system of claim 7, wherein the extension card comprises:
a conductive segment on a surface of the extension card; and
a conductive line coupled between the conductive segment and the system board.

9. The memory device test system of claim 1, wherein the memory device is configured to transmit the output signal corresponding to the test through the system board.

10. A memory device test system, comprising:
a memory device;
a tester configured to generate a first control signal and a first power signal corresponding to a test being performed to the memory device, and a switch signal;
an intermediate device coupled between the memory device and the tester, configured to generate, in response to the first control signal, a second control signal and a second power signal, and the intermediate device is further configured to transmit, in response to the switch signal, either the first power signal or the second power signal to the memory device; and
wherein the memory device is configured to generate, in response to the first power signal, the second control signal and the second power signal, an output signal corresponding to the test to the tester.

11. The memory device test system of claim 10, wherein the intermediate device comprises:
a first conductive segment;
a second conductive segment;
a connection device coupled between the first conductive segment and the second conductive segment; and
a system board coupled to the first conductive segment.

12. The memory device test system of claim 11, wherein the first conductive segment, the second conductive segment, and the connection device are included in a first conductive path coupled to the memory device, and the second conductive segment is included in a second conductive path coupled to the memory device.

13. The memory device test system of claim 12, wherein the connection device is turned on, in response to the switch signal, to form the first conductive path to transmit the second power signal.

14. The memory device test system of claim 12, wherein the connection device is turned off, in response to the switch signal, to form the second conductive path to transmit the first power signal.

15. The memory device test system of claim 11, wherein the first control signal, the second control signal, and the output signal are transmitted through the system board.

* * * * *